United States Patent
Lee et al.

(10) Patent No.: US 12,411,995 B2
(45) Date of Patent: Sep. 9, 2025

(54) APPARATUS AND METHOD FOR IDENTIFYING ABNORMAL PROCESSOR AND COMPUTER-READABLE STORAGE MEDIUM

(71) Applicant: AGENCY FOR DEFENSE DEVELOPMENT, Daejeon (KR)

(72) Inventors: Hwaseong Lee, Daejeon (KR); Jeongchan Park, Daejeon (KR); Changon Yoo, Daejeon (KR); Jingoog Kim, Daejeon (KR); Yeojeong Yoon, Daejeon (KR); Ilhoon Jung, Daejeon (KR); Sung Jin Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 544 days.

(21) Appl. No.: 17/456,529

(22) Filed: Nov. 24, 2021

(65) Prior Publication Data

US 2023/0057138 A1 Feb. 23, 2023

(30) Foreign Application Priority Data

Aug. 17, 2021 (KR) .......... 10-2021-0108113

(51) Int. Cl.
*G06F 21/71* (2013.01)
*G06N 20/20* (2019.01)

(52) U.S. Cl.
CPC .......... *G06F 21/71* (2013.01); *G06N 20/20* (2019.01)

(58) Field of Classification Search
CPC ................................ G06F 21/71; G06N 20/20
See application file for complete search history.

(56) References Cited

U.S. PATENT DOCUMENTS

| | | | |
|---|---|---|---|
| 10,341,374 B1* | 7/2019 | Sadaghiani | G06F 18/217 |
| 2013/0019105 A1* | 1/2013 | Hussain | G06F 21/31 |
| | | | 713/189 |
| 2021/0064751 A1* | 3/2021 | Li | G06F 18/2413 |
| 2021/0409429 A1* | 12/2021 | Komashinskiy | G06N 20/00 |

(Continued)

OTHER PUBLICATIONS

Office Action of corresponding KR patent application No. 10-2021-0108113. (issued on Nov. 6, 2022).

(Continued)

*Primary Examiner* — Pramila Parthasarathy
(74) *Attorney, Agent, or Firm* — Knobbe, Martens, Olson & Bear, LLP

(57) ABSTRACT

This application relates to an apparatus for identifying an abnormal processor. In one aspect, the apparatus includes a memory information collection part that collects memory region information and dynamic library information of a memory. The apparatus may also include a first identification part that identifies an abnormal processor by using a first machine learning model pre-trained based on the memory region information. The apparatus may further include a second identification part that identifies an abnormal processor by using a second machine learning model pre-trained based on the dynamic library information. The apparatus may further include a determination part that determines a final abnormal processor based on either the abnormal processor identified using the first machine learning model or the abnormal processor identified using the second machine learning model.

6 Claims, 3 Drawing Sheets

(56) References Cited

U.S. PATENT DOCUMENTS

2022/0100482 A1* 3/2022 Eigler ................. G06F 8/44
2023/0342282 A1* 10/2023 Mola .............. G06F 12/0875

OTHER PUBLICATIONS

Dae Glendowne, "Automating Malware Detection in Windows Memory Images using Machine Learning" Mississippi State University, Theses and Dissertions (2015).
Chang Seal Lee et al., "A Method for preventing online games hacking using memory monitoring" ETRI Journal. 2021;43(1):141-151. (Dec. 8, 2020).
Ali Ghasempour et al., "Permission Extraction Framework for Android Malware Detection" (IJACSA) International Journal of Advanced Computer Science and Applications, vol. 11, No. 11, 2020 (2020).

* cited by examiner

APPARATUS AND METHOD FOR IDENTIFYING ABNORMAL PROCESSOR AND COMPUTER-READABLE STORAGE MEDIUM

CROSS-REFERENCE TO RELATED APPLICATION

This application claims priority to Korean Patent Application No. 10-2021-0108113, filed on Aug. 17, 2021. The entire contents of the application on which the priority is based are incorporated herein by reference.

BACKGROUND

Technical Field

The present disclosure relates to an apparatus and method for identifying an abnormal processor.

Description of Related Technology

In general, process insertion is a technique used in a Windows operating system, in which code containing malicious acts is inserted into a processor memory region to carry out the malicious acts. These malicious acts achieve a stronger hidden function than those carried out on a process basis since they do not operate as one process but are carried out as codes present in a normal processor memory, and are used to bypass vaccines.

SUMMARY

The present disclosure provides an apparatus and method for identifying an abnormal processor, in order to prevent the abnormal processor from being non-identifiable due to false positives.

In accordance with an aspect of the present disclosure, there is provided an apparatus for identifying an abnormal processor, the apparatus including: a memory information collection part that collects memory region information; and an identification part that identifies an abnormal processor by using a machine learning model pre-trained based on the memory region information.

Further, the memory region information may include at least one of information obtained by transforming an authority of a memory region into term frequency—inverse document frequency (TF-IDF), a type of processor memory, a level of similarity to a binary in a processor memory region, and memory use authority information.

Further, the machine learning model may be pre-trained by using memory region information of a normal processor and memory region information of an abnormal processor as label data and input data.

In accordance with another aspect of the present disclosure, there is provided an apparatus for identifying an abnormal processor, the apparatus including: a memory information collection part that collects dynamic library information of a memory; and an identification part that identifies an abnormal processor by using a machine learning model pre-trained based on the dynamic library information.

Further, the dynamic library information may include information on whether a dynamic library contains an electronic signature or not and information on a history of previous uses of dynamic libraries.

Further, the machine learning model may be pre-trained by using dynamic library information of a normal processor and dynamic library information of an abnormal processor as label data and input data.

In accordance with still another aspect of the present disclosure, there is provided an apparatus for identifying an abnormal processor, the apparatus including: a memory information collection part that collects memory region information and dynamic library information of a memory; a first identification part that identifies an abnormal processor by using a first machine learning model pre-trained based on the memory region information; a second identification part that identifies an abnormal processor by using a second machine learning model pre-trained based on the dynamic library information; and a determination part that determines a final abnormal processor based on either the abnormal processor identified using the first machine learning model or the abnormal processor identified using the second machine learning model.

Further, the determination part may determine the final abnormal processor by assigning a weighted value to either the abnormal processor identified by the first identification part or the abnormal processor identified by the second identification part.

In accordance with still another aspect of the present disclosure, there is provided a method for identifying an abnormal processor, which is performed by an apparatus for identifying the abnormal processor, the method including: collecting memory region information and dynamic library information of a memory; identifying an abnormal processor by using a first machine learning model pre-trained based on the memory region information; identifying an abnormal processor by using a second machine learning model pre-trained based on the dynamic library information; and determining a final abnormal processor based on either the abnormal processor identified using the first machine learning model or the abnormal processor identified using the second machine learning model.

Further, the memory region information may include at least one of information obtained by transforming an authority of a memory region into term frequency—inverse document frequency (TF-IDF), a type of processor memory, a level of similarity to a binary in a processor memory region, and memory use authority information.

Further, the dynamic library information may include information on whether a dynamic library contains an electronic signature or not and information on a history of previous uses of dynamic libraries.

In accordance with still another aspect of the present disclosure, there is provided a non-transitory computer-readable storage medium including computer-executable instructions which cause, when executed by a processor, the processor to perform a method including: collecting memory region information and dynamic library information of a memory; identifying an abnormal processor by using a first machine learning model pre-trained based on the memory region information; identifying an abnormal processor by using a second machine learning model pre-trained based on the dynamic library information; and determining a final abnormal processor based on either an abnormal processor identified using the first machine learning model or an abnormal processor identified using the second machine learning model.

According to embodiments of the present disclosure, it is possible to create a distinguished model for each process based on memory region information of a processor and to improve the ability of identifying an abnormal process, compared to a method in which the same rules apply to every process.

Furthermore, according to embodiments of the present disclosure, it is possible to provide the identification of dynamic library insertion which is not provided by a conventional abnormal process identifier.

Furthermore, according to embodiments of the present disclosure, it is possible to enhance speed compared to existing technologies since only normal memory regions are retrieved.

DETAILED DESCRIPTION

Generally, in an abnormal process identification method, rule-based identification is performed on the attributes of a memory region in a processor and binary in the memory region. Here, the attributes of the memory region refer to the authority, type, and tag of the memory region. Binary refers to data the memory actually contains.

As for memory region analysis, binary is analyzed based on rules. That is, if there is a fixed value at a fixed position of binary, it is determined that a process insertion may have occurred. For example, if the value "MZ", which is a magic header in an executable file, is present in binary, this is identified as an abnormal process.

As for memory attribute analysis, the authority, type, and tag of memory are analyzed based on rules. That is, if a memory region in a processor to be analyzed has a specific authority and tag, they are reflected in the identification of an abnormal process. For example, if a memory region has authority to read, write, and execute, this corresponds to a primary rule for determining an abnormal process.

The above-described abnormal process identification method has many false positives since it is a rule-based method. This is because process insertion may be used for a malicious purpose but also may be used during a normal activity of a processor to create a memory region that is highly likely to be abnormal when rule-based identification applies.

That is, the abnormal process identification method does not reflect the specificity of a process in which process insertion is used as a normal activity. Moreover, this method does not involve the analysis of dynamic library insertion, which makes the identification impossible if process insertion is performed using this technique.

Hereinafter, an embodiment will be described in detail with reference to the drawings.

Figure 1:
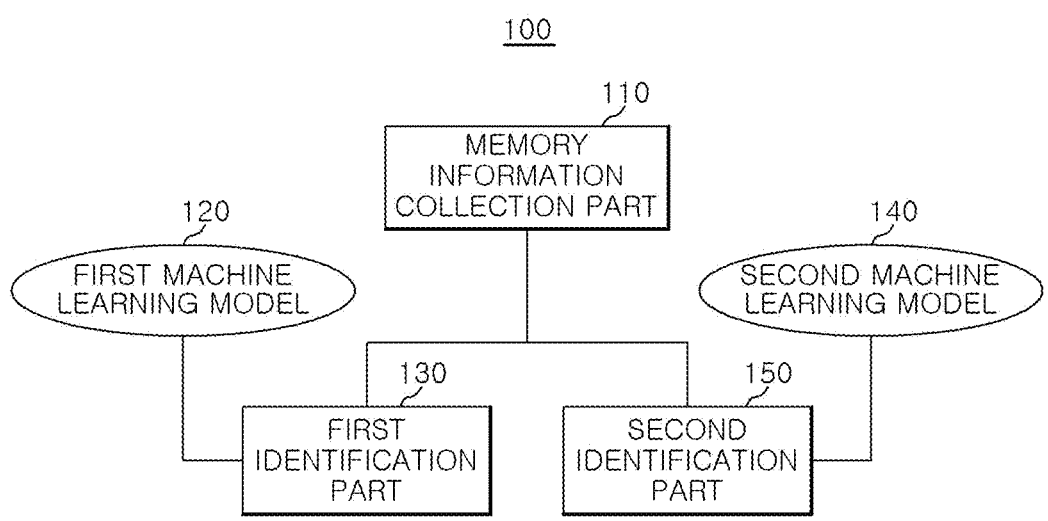
FIG. 1 is a block diagram showing an abnormal processor identification apparatus according to an embodiment of the present disclosure.

FIG. 1 is a block diagram showing an abnormal processor identification apparatus according to an embodiment of the present disclosure.

Referring to FIG. 1, the abnormal processor identification apparatus 100 according to the embodiment of the present disclosure may include a memory information collection part 110, a first identification part 130, and a second identification part 150.

The memory information collection part 110 may collect memory region information and dynamic library information. The memory region information and the dynamic library information may be information to be used as input into a machine learning model and also may be information obtained by converting information received from memory.

The memory region information may include information obtained by transforming the authority of a memory region into term frequency—inverse document frequency (TF-IDF), the type of processor memory, the level of similarity to the binary in the processor memory region, and memory use authority information.

The dynamic library information of the memory may include information on whether a dynamic library contains an electronic signature or not and information on a history of previous uses of dynamic libraries.

The first identification part 130 may identify an abnormal processor based on the memory region information. The first identification part 130 may identify an abnormal processor by using a first machine learning model 120 which is pre-trained. The first machine learning model 120 may be pre-trained by using memory region information of a normal processor and memory region information of an abnormal processor as label data and input data. A variety of artificial intelligence models such as a neural network, a deep learning model, etc. may be used as well as the first machine learning model 120.

Meanwhile, the second identification part 150 may identify an abnormal processor based on the dynamic library information. The second identification part 150 may identify an abnormal processor by using a second machine learning model 140 which is pre-trained. The second machine learning model 140 may be pre-trained by using dynamic library information of a normal processor and memory region information of an abnormal processor as label data and input data. A variety of artificial intelligence models such as a neural network, a deep learning model, etc. may be used as well as the second machine learning model 140.

The first machine learning model 120 and the second machine learning model 140 may be created by a separate machine learning model creator. Alternatively, the first machine learning model 120 and the second machine learning model 140 may be created externally.

The embodiment allows for effectively identifying an abnormal processor by using the memory region information and the dynamic library information.

According to another embodiment, the identification of an abnormal processor may be done by considering both the memory region information and the dynamic library information.

Figure 2:
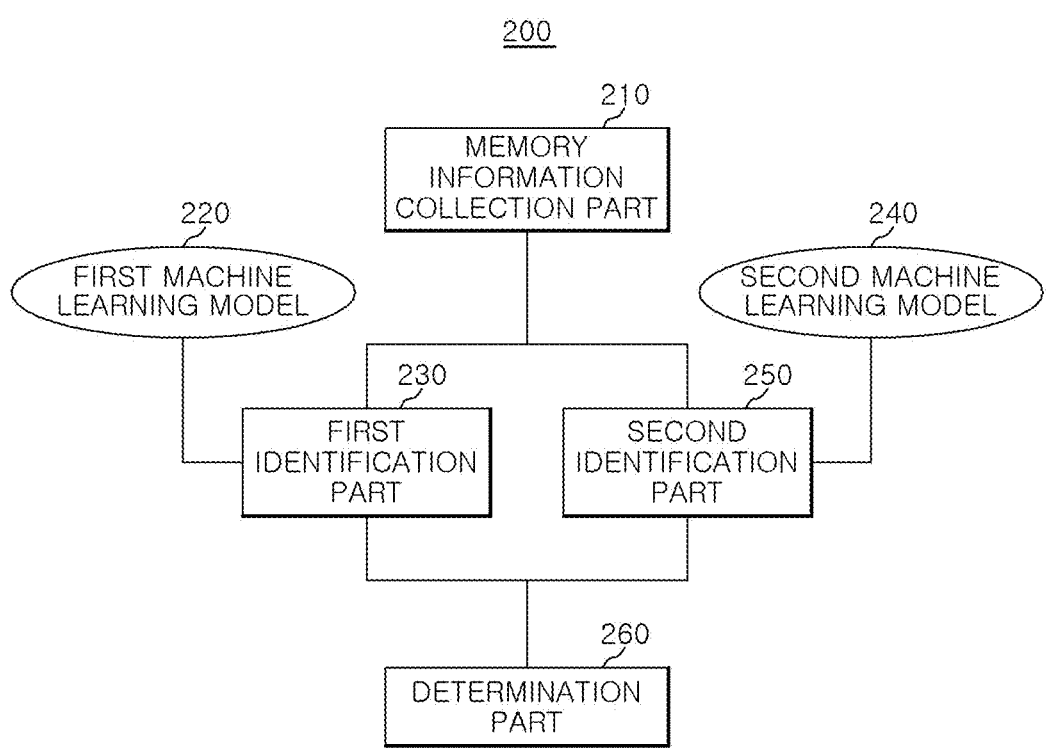
FIG. 2 is a block diagram showing an abnormal processor identification apparatus according to another embodiment of the present disclosure.

FIG. 2 is a block diagram showing an abnormal processor identification apparatus according to another embodiment of the present disclosure.

As depicted in FIG. 2, the abnormal processor identification apparatus 200 according to another embodiment may include a memory information collection part (or a memory information collection processor) 210, a first identification part (or a first identification processor) 230, a second identification part (or a second identification processor) 250, and a determination part (or a determination processor) 260.

The memory information collection part 210 may collect memory region information and dynamic library information. The memory region information and the dynamic library information may be information to be used as input into a machine learning model and also may be information obtained by converting information received from memory.

The memory region information may include information obtained by transforming the authority of a memory region into term frequency—inverse document frequency (TF-IDF), the type of processor memory, the level of similarity to the binary in the processor memory region, and memory use authority information.

The dynamic library information of the memory may include information on whether a dynamic library contains an electronic signature or not and information on a history of previous uses of dynamic libraries.

The first identification part 230 may identify an abnormal processor based on the memory region information. The first identification part 230 may identify an abnormal processor by using a first machine learning model 220 which is pre-trained. The first machine learning model 220 may be pre-trained by using memory region information of a normal processor and memory region information of an abnormal processor as label data and input data. A variety of artificial intelligence models such as a neural network, a deep learning model, etc. may be used as well as the first machine learning model 220.

Meanwhile, the second identification part 250 may identify an abnormal processor based on the dynamic library information. The second identification part 250 may identify an abnormal processor by using a second machine learning model 240 which is pre-trained. The second machine learning model 240 may be pre-trained by using dynamic library information of a normal processor and memory region information of an abnormal processor as label data and input data. A variety of artificial intelligence models such as a neural network, a deep learning model, etc. may be used as well as the second machine learning model 240.

The determination part 260 may determine a final abnormal processor based on either an abnormal processor identified by the first identification part 230 or an abnormal processor identified by the second identification part 250.

The first identification part 230 may identify a processor as an abnormal processor, whereas the second identification part 250 may not identify it as an abnormal processor. The determination part 260 may determine a final abnormal processor by assigning a weighted value to the first identification part 230 or the second identification part 250.

For example, in a case where the first identification part 230 identifies a processor as an abnormal processor but the second identification part 250 does not identify it as an abnormal processor, with a weighted value assigned to the first identification part 230, the determination part 260 may determine that an abnormal processor has been identified.

Otherwise, in a case where the first identification part 230 does not identify a processor as an abnormal processor but the second identification part 250 identifies it as an abnormal processor, with a weighted value assigned to the first identification part 230, the determination part 260 may determine that an abnormal processor has not been identified.

Otherwise, the determination part 260 may identify a final abnormal processor by using abnormal processor information identified by the first identification part 230 and abnormal processor information identified by the second identification part 250 as input into a pre-trained third machine learning model (not shown).

Figure 3:
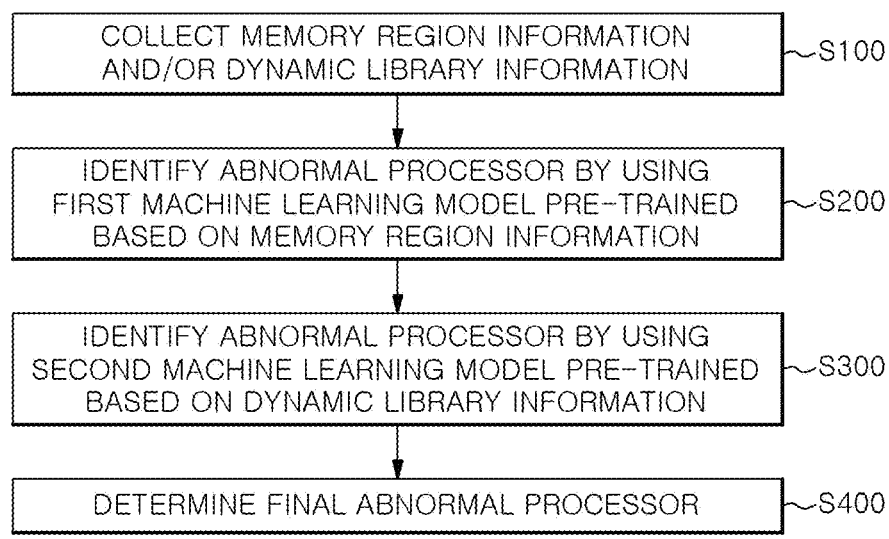
FIG. 3 is a flowchart showing an abnormal processor identification method according to an embodiment of the present disclosure.

FIG. 3 is a flowchart showing an abnormal processor identification method according to an embodiment of the present disclosure.

Referring to FIG. 3, the abnormal processor identification method according to the embodiment may include the step S100 of collecting memory region information and dynamic library information of the memory, the step S200 of identifying an abnormal processor by using a first machine learning model pre-trained based on the memory region information, the step S300 of identifying an abnormal processor by using a second machine learning model pre-trained based on the dynamic library information, and the step S400 of determining a final abnormal processor based on either an abnormal processor identified using the first machine learning model or an abnormal processor identified using the second machine learning model. Here, the step S400 may be omitted.

In the step S100, at least either or both of the memory region information and the dynamic library information may be collected.

In the step S200, an abnormal processor may be identified based on the memory region information. To this end, the first machine learning model may be used.

In the step S300, an abnormal processor may be identified based on the dynamic library information. To this end, the second machine learning model may be used.

As above, the abnormal processor identification method allows for identifying an abnormal processor based on memory region information or based on dynamic library information.

In the step S400, a final abnormal processor may be determined based on either an abnormal processor identified using the first machine learning model or an abnormal processor identified using the second machine learning model. In the step S400, a final abnormal processor may be determined using a weighted third machine learning model. The step S400 may be omitted.

The various embodiments described above may be implemented as software (e.g., a program) including instructions stored in a machine-readable storage media (e.g., a memory (an internal memory or an external memory)). The machine (e.g., a computer) may be a device capable of calling a stored instruction from a storage medium and operating according to the called instruction, and may include an electronic device according to the disclosed embodiments. When the instruction is executed by a controller, the controller may perform a function corresponding to the instruction directly or by using other components under the control of the controller. The instruction may include a code generated or executed by a compiler or an interpreter. The machine-readable storage media may be provided in a form of a non-transitory storage medium. Herein, the 'non-transitory' indicates that the storage medium does not include a signal and is tangible, but does not distinguish that the data is stored in the storage medium semi-permanently or temporarily.

In addition, according to an aspect of the present disclosure, a method according to the various embodiments described above may be provided by being included in a computer program product.

Further, according to another aspect of the present disclosure, there may be provided a non-transitory computer-readable storage medium including computer-executable instructions which cause, when executed by a processor, the processor to perform a method for identifying an abnormal processor, which is performed by an apparatus for identifying the abnormal processor, the method comprising: collecting memory region information and dynamic library information of a memory; identifying an abnormal processor by using a first machine learning model pre-trained based on the memory region information; identifying an abnormal processor by using a second machine learning model pre-trained based on the dynamic library information; and determining a final abnormal processor based on either an abnormal processor identified using the first machine learning model or an abnormal processor identified using the second machine learning model.

While certain embodiments have been described, these embodiments have been presented by way of example only and are not intended to limit the scope of the disclosures. Indeed, the embodiments described herein may be embodied in a variety of other forms. Furthermore, various omissions, substitutions and changes in the form of the embodiments described herein may be made departing from the spirit of the disclosures. The accompanying claims and their equivalents are intended to cover such forms or modifications as would fall within the scope and spirit of the disclosures.

What is claimed is:

1. An apparatus for identifying an abnormal processor, the apparatus comprising:
    a memory information collection processor configured to collect memory region information and dynamic library information of a memory;
    a first identification processor configured to identify a processor as an abnormal processor by using a first machine learning model pre-trained based on the memory region information of both a normal processor and an abnormal processor;
    a second identification processor configured to identify the processor as an abnormal processor by using a second machine learning model pre-trained based on the dynamic library information of both a normal processor and an abnormal processor; and
    a determination processor configured to determine a final abnormal processor based on either the abnormal processor identified using the first machine learning model or the abnormal processor identified using the second machine learning model by assigning a weighted value to either the abnormal processor identified by the first identification processor or the abnormal processor identified by the second identification processor,
    wherein the memory region information includes at least one of i) information obtained by transforming an authority of a memory region into term frequency-inverse document frequency (TF-IDF) or ii) a level of similarity to a binary in a processor memory region,
    wherein the dynamic library information includes information on whether a dynamic library contains an electronic signature or not and information on a history of previous uses of dynamic libraries, and
    wherein the determination processor is configured to determine the final abnormal processor by using abnormal processor information identified by the first identification processor and abnormal processor information identified by the second identification processor as input into a weighted third pre-trained machine learning model different from the first machine learning model and the second machine learning model.

2. The apparatus of claim 1, wherein in response to the first identification processor identifying the processor as an abnormal processor and the second identification processor identifying the processor as a normal processor, the determination processor is configured to assign the weighted value to the first identification processor and determine that the processor is an abnormal processor.

3. The apparatus of claim 1, wherein in response to the first identification processor identifying the processor as a normal processor and the second identification processor identifying the processor as an abnormal processor, the determination processor is configured to assign the weighted value to the first identification processor and determine that the processor is a normal processor.

4. A non-transitory computer-readable storage medium including computer-executable instructions which cause, when executed by a processor, the processor to perform a method for identifying an abnormal processor, which is performed by an apparatus for identifying the abnormal processor, the method comprising:
    collecting memory region information and dynamic library information of a memory;
    identifying, by a first identification processor, a processor as an abnormal processor by using a first machine learning model pre-trained based on the memory region information of both a normal processor and an abnormal processor;
    identifying, by a second identification processor, the processor as an abnormal processor by using a second machine learning model pre-trained based on the dynamic library information of both a normal processor and an abnormal processor;
    determining a final abnormal processor based on either the abnormal processor identified using the first machine learning model or the abnormal processor identified using the second machine learning model by assigning a weighted value to either the abnormal processor identified by the first identification processor or the abnormal processor identified by the second identification processor; and
    determining the final abnormal processor by using abnormal processor information identified by the first identification processor and abnormal processor information identified by the second identification processor as input into a weighted third pre-trained machine learning model different from the first machine learning model and the second machine learning model,
    wherein the memory region information includes at least one of i) information obtained by transforming an authority of a memory region into term frequency-inverse document frequency (TF-IDF) or ii) a level of similarity to a binary in a processor memory region, and
    wherein the dynamic library information includes information on whether a dynamic library contains an electronic signature or not and information on a history of previous uses of dynamic libraries.

5. The medium of claim 4, wherein the first machine learning model is pre-trained by using memory region information of a normal processor and memory region information of an abnormal processor as label data and input data.

6. The medium of claim 4, wherein the second machine learning model is pre-trained by using dynamic library information of a normal processor and dynamic library information of an abnormal processor as label data and input data.

* * * * *